United States Patent
Trappeniers et al.

(10) Patent No.: US 7,600,137 B2
(45) Date of Patent: Oct. 6, 2009

(54) METHOD FOR WAKING UP A SLEEPING DEVICE, A RELATED NETWORK ELEMENT AND A RELATED WAKING DEVICE AND A RELATED SLEEPING DEVICE

(75) Inventors: Lieven Leopold Albertine Trappeniers, Noorderwijk (BE); Arjen Hendrikse, Etterbeek (BE); Marc Bruno Frieda Godon, Londerzeel (BE); Koen Handekyn, Ghent (BE)

(73) Assignee: Alcatel, Paris (FR)

( * ) Notice: Subject to any disclaimer, the term of this patent is extended or adjusted under 35 U.S.C. 154(b) by 662 days.

(21) Appl. No.: 11/010,437

(22) Filed: Dec. 14, 2004

(65) Prior Publication Data
US 2005/0131556 A1  Jun. 16, 2005

(30) Foreign Application Priority Data
Dec. 15, 2003   (EP)   .................................. 03293172

(51) Int. Cl.
*G06F 1/00* (2006.01)
(52) U.S. Cl. ........................ 713/310; 713/300; 713/320; 713/323; 709/224; 715/736
(58) Field of Classification Search .................. 709/224; 713/323, 300, 310, 320; 715/736
See application file for complete search history.

(56) References Cited
U.S. PATENT DOCUMENTS

| | | | |
|---|---|---|---|
| 5,287,537 A * | 2/1994 | Newmark et al. ............. 712/29 |
| 5,835,719 A * | 11/1998 | Gibson et al. ................ 709/221 |
| 5,886,647 A * | 3/1999 | Badger et al. .......... 340/825.69 |
| 6,047,378 A * | 4/2000 | Garrett et al. ................ 713/300 |
| 6,182,094 B1 * | 1/2001 | Humpleman et al. ........ 715/234 |
| 6,198,479 B1 * | 3/2001 | Humpleman et al. ........ 715/733 |
| 6,219,796 B1 * | 4/2001 | Bartley ......................... 713/320 |
| 6,288,716 B1 * | 9/2001 | Humpleman et al. ........ 715/733 |
| 6,363,434 B1 * | 3/2002 | Eytchison .................... 719/313 |
| 6,519,720 B1 * | 2/2003 | Mores .......................... 714/43 |
| 6,581,094 B1 * | 6/2003 | Gao ............................. 709/220 |
| 6,591,368 B1 * | 7/2003 | Ryu ............................. 713/323 |

(Continued)

FOREIGN PATENT DOCUMENTS

EP    0 835 008 A2    4/1998

(Continued)

OTHER PUBLICATIONS

"Definition of a Global Wake on Local Area Network Frame", IBM Technical Disclosure Bulletin, IBM Corp, NY, US, vol. 39, No. 12, Dec. 1, 1996, pp. 41-42 XP002235865.

*Primary Examiner*—Chun Cao
*Assistant Examiner*—Jaweed A Abbaszadeh
(74) *Attorney, Agent, or Firm*—Sughrue Mion, PLLC

(57) ABSTRACT

A method for waking up a plurality of sleeping devices. Each sleeping device is coupled to a waking device over a communications network and is adapted to provide a service feature to the waking device upon a request for the service feature from the waking device. The waking device sends a request for service to a network element of the communications network, which is always on. The network element receives the request for service, determines which features are requested by the waking device, and wakes up the sleeping devices that provide these requested features.

19 Claims, 2 Drawing Sheets

U.S. PATENT DOCUMENTS

| | | | | |
|---|---|---|---|---|
| 6,633,757 | B1* | 10/2003 | Hermann et al. | 455/414.1 |
| 6,694,349 | B1* | 2/2004 | Zou | 709/202 |
| 6,801,974 | B1* | 10/2004 | Watts et al. | 710/303 |
| 6,954,523 | B2* | 10/2005 | Duspiva et al. | 379/207.02 |
| 6,957,275 | B1* | 10/2005 | Sekiguchi | 709/245 |
| 7,107,442 | B2* | 9/2006 | Cheshire | 713/1 |
| 7,164,885 | B2* | 1/2007 | Jonsson et al. | 455/41.2 |
| 7,251,736 | B2* | 7/2007 | Dayan et al. | 713/310 |
| 7,315,886 | B1* | 1/2008 | Meenan et al. | 709/219 |
| 7,337,219 | B1* | 2/2008 | Meenan et al. | 709/220 |
| 7,349,965 | B1* | 3/2008 | Graupner et al. | 709/226 |
| 7,363,405 | B2* | 4/2008 | Isoda | 710/105 |
| 2002/0173325 | A1 | 11/2002 | Rosen et al. | |
| 2002/0187750 | A1* | 12/2002 | Majumdar | 455/41 |
| 2003/0101057 | A1* | 5/2003 | Torge et al. | 704/270.1 |
| 2003/0195957 | A1* | 10/2003 | Banginwar | 709/223 |
| 2004/0003058 | A1* | 1/2004 | Trossen | 709/220 |
| 2004/0024912 | A1* | 2/2004 | Fukao et al. | 709/249 |
| 2004/0025064 | A1* | 2/2004 | Felsman | 713/300 |
| 2004/0162804 | A1* | 8/2004 | Strittmatter et al. | 707/1 |
| 2004/0176118 | A1* | 9/2004 | Strittmatter et al. | 455/500 |
| 2004/0243860 | A1* | 12/2004 | Green et al. | 713/300 |
| 2004/0247281 | A1* | 12/2004 | Torge et al. | 386/46 |
| 2005/0027659 | A1* | 2/2005 | Kumar et al. | 705/400 |
| 2005/0066022 | A1* | 3/2005 | Liebenow | 709/223 |
| 2005/0100026 | A1* | 5/2005 | Mancour | 370/400 |
| 2005/0177616 | A1* | 8/2005 | Addington et al. | 709/203 |
| 2005/0234726 | A1* | 10/2005 | Torge et al. | 704/270.1 |
| 2006/0075269 | A1* | 4/2006 | Liong et al. | 713/300 |

FOREIGN PATENT DOCUMENTS

EP    0 977 112 A2    2/2000

* cited by examiner

METHOD FOR WAKING UP A SLEEPING DEVICE, A RELATED NETWORK ELEMENT AND A RELATED WAKING DEVICE AND A RELATED SLEEPING DEVICE

BACKGROUND OF THE INVENTION

1. Field of the Invention

The present invention relates to a method for waking up a sleeping device, as described in the preamble of claim 1, the related waking device as described in the preamble of claim 3 and the related sleeping device as described in the preamble of claim 4.

2. Description of Related Art

Such a method and related devices are already known in the art, e.g. from the European Patent Application with reference EP0977112 A2 with title "METHOD AND APPARATUS FOR CONTROLLING POWER OF A COMPUTER SYSTEM ON A LAN (LOCAL AREA NETWORK)" from the inventor Ryu, Chang-Hyun published at Feb. $2^{nd}$, 2000.

Therein, a method for controlling power of a computer system coupled to a communications network, called Local Area Network, using a wake on local area network LAN signal is described. Such a computer system contains a "wake-on-LAN" feature allowing computer systems that are in a sleeping state, called powered-off state, to wake up, called powered up, at receiving of a wake on LAN signal from a service requesting device on a network interface of the computer system. In this method it is only possible to wake up a single personal computer in such a communications network by sending the wake on LAN signal, on a network interface of the sleeping computer system.

This simple technology however fails to enable more refined scenarios where other triggers require the wake-up of several devices at the same time. For instance, present, communications networks such as a multimedia connected home which is a mixture of devices like HiFi & TV-sets possibly are IP aware, multimedia PC's, storage devices, webcams and DSL modems. Most of such consumer electronic products already contain some form of low-power standby mode, sleeping mode and are maintained in a sleeping state if not in use.

However, if a user desires a certain service, consisting of several service features, to be provisioned by several sleeping devices it is only possible to wake up a single device as the present state-of-the art only allows a single computer system to wake up by directing LAN traffic on a network interface of the computer system. Hence, there is no solution available in the present state of the art to wake up at the same time all sleeping devices that are required to provision a certain service consisting of several service features.

SUMMARY OF THE INVENTION

An object of the present invention is to provide a method for waking up a sleeping device of the above known type and a network element for waking up a sleeping device but wherein a plurality of sleeping devices required for provisioning a requested service are woken up at the same time.

According to the present invention, this object is achieved by the method for waking up a sleeping device as described in claim 1, the Network Element as described in claim 2, the related waking device as described in claim 3 and the related sleeping device as described in claim 4.

Indeed, by engaging a Network Element in the communications network which is always on, this Network Element is, at any time, able to receive a request for service from the waking device, where this service comprises a plurality of service features to be provisioned and at reception of the request for service by the network element, this network element generates based on the plurality of service features in the service request of the waking device, a request to wake up each sleeping device of said plurality of sleeping devices that corresponds to a service feature of the plurality of service features and subsequently the Network Element, sends the requests to wake up to the sleeping devices that correspond to a service feature of the plurality of service features.

In this way the waking device is provided with a facility that at request for a certain kind of service all devices required to provision such a requested service are requested to wake up and get ready for provisioning the corresponding requested service features.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF EXEMPLARY EMBODIMENTS

Figure 1:
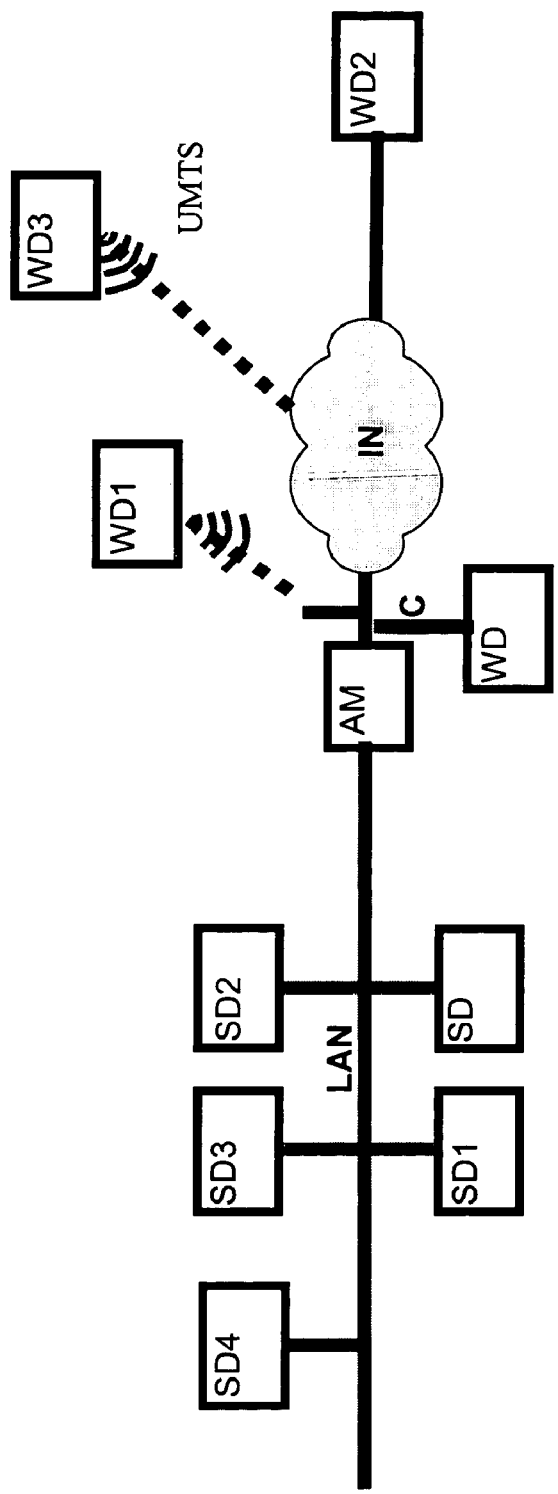
FIG. 1 represents a communications network wherein the present invention is executed.
Figure 2:
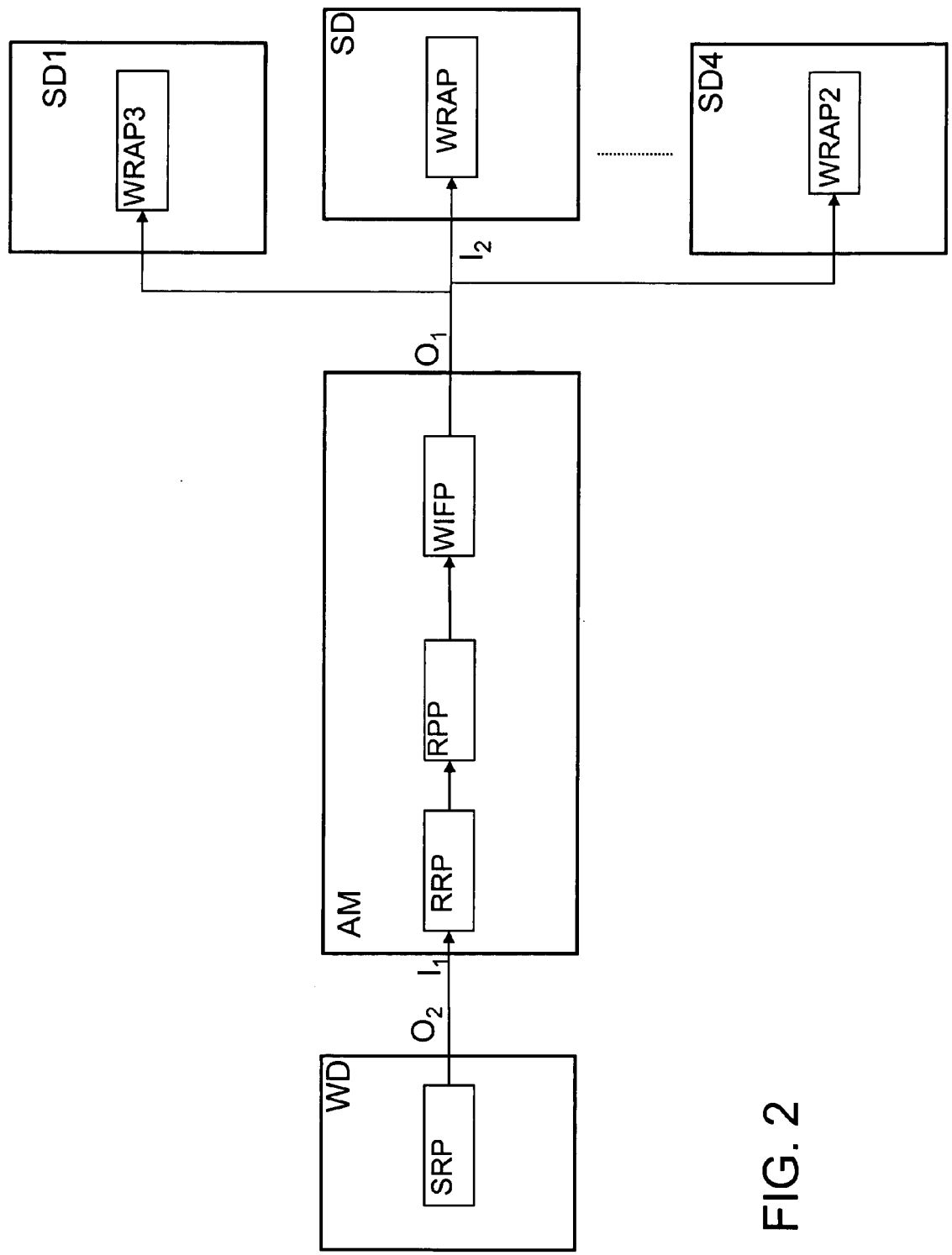
FIG. 2 represents the functional representation of a sleeping device SD . . . SD4, a waking device WD and a Network Element AM as presented in FIG. 1.

In the following paragraphs, referring to the drawings, an implementation of the method for waking up a sleeping device, sleeping devices SD . . . SD4, a Network Element AM and waking devices WD . . . WD3 according to the present invention will be described. In the first paragraph of this description the main elements of the communications system as presented in FIG. 1 are described. In the second paragraph, all connections between the before mentioned elements and described means are defined. Subsequently all relevant functional means of the sleeping device SD, the Network Element AM and the waking device WD as presented in FIG. 2 are described followed by a description of all interconnections. In the succeeding paragraph the actual execution of the method for waking up a sleeping device is described.

The essential elements of the communications network of the embodiment according to the present invention are sleeping devices SD . . . SD4 which are in a power down state because of an energy saving strategy while not in use, waking devices WD . . . WD3 which are able to request a service from one or more sleeping devices and a Network Element AM having a certain functionality in the communications network, such a gateway or an ADSL modem or even a telephone set, and which is always powered on.

In this embodiment, it has been chosen to describe a number of sleeping devices, present in the home environment of a user, at first a storage server SD, and besides a MP3 player SD1, a digital VCR SD2, a digital camera SD3 and a Television set SD4. The Network Element AM here is chosen to be an always-powered ADSL modem. Alternatively this may be a Personal Computer, which is always on and forms part of the communications network or any other device in the communications, which is always on, such as a telephone set. The waking device are a telephone set WD, a remote user terminal WD2, or a personal assistant WD1 that are able to request a service of a sleeping device or a set of sleeping devices, where for instance a number of sleeping devices, when arrived in an awake state, co-operate to provide the requested service. Optionally there may be a UMTS terminal WD3 for requesting services of sleeping device or a set of sleeping devices.

Each of the sleeping devices SD . . . SD4 present in the user's home environment is coupled to a Local Area Network LAN, further referred to as LAN, which is installed at the user's house. Alternatively, each of the sleeping devices together with the always on Network Element AM may be coupled over a wireless network. Then the ADSL modem AM couples the LAN to the internet network IN. The waking devices, the telephone set WD and the personal assistant WD1 are coupled to the ADSL modem over respectively a copper wire and an GPRS air link.

The waking devices alternatively may be coupled directly to the LAN.

The UMTS terminal WD3 is coupled over an UMTS link to the internet network IN.

An essential element of the waking device WD is the service requesting part SRP that is able to forward a request for service, destined to a Network element AM of the communications network which is always on, where the requested service comprises a plurality of service features.

The Network Element AM which is always on, comprises a request reception part RRP that is able to receive the request for service, where the service comprises a plurality of service features, which is forwarded by the waking device and further there is a request processing part RPP that is able to, at reception of the request for service, generate, based on the plurality of service features in the service request of the waking device WD, a request to wake up each sleeping device of the plurality of sleeping devices that corresponds to a service feature of the plurality of service features comprised by the request for service. Further there is a wake up instruction forwarding part WIFP for sending the request to wake up to each sleeping device of the plurality of sleeping devices SD . . . SD4 that corresponds to a service feature of the plurality of service features. The sleeping device SD has a wake up receiving and activating part WRAP that is able to receive a wake up request, interpret said request and wake up said sleeping device.

It is to be noted that any of the waking devices WD1 . . . WD3 has the same structure as waking device WD and any of the sleeping devices SD1 . . . SD4 has the same structure as the sleeping device SD as previously described.

The service requesting part SRP, of the waking device, has an output-terminal that is at the same time output-terminal $O_2$ of the waking device WD.

Further, the request reception part RRP has an input-terminal that is at the same time an input-terminal $I_1$ of the Network Element AM and is further coupled with an output to an input of the a request processing part RPP. The request processing part RPP further is coupled with an output to an input of the wake up instruction forwarding part WIFP. The wake up instruction forwarding part WIFP additionally has an output-terminal that is at the same time output-terminal $O_1$ of the Network Element AM.

The wake up reception and activating part WRAP of the sleeping device has an input-terminal that is at the same time an input-terminal $I_2$ of the sleeping device SD.

The wake up reception and activating part of the sleeping devices SD1 . . . SD3 all have an input-terminal that is at the same time an input-terminal of the sleeping device SD.

In order to explain the operation of the present invention it is assumed that the waking device here is a remote user terminal WD1 wherefrom the user remotely at this personal computer coupled to the Internet Network IN wants to show his digital movies, digital pictures and play the corresponding sound in an MP3 format which all are stored at a storage device in his home network.

The remote user terminal WD1 at the time of requesting his home network devices to display his digital movies and pictures and at the same time play a belonging sound stored in a MP3 format has the service request forwarding part SRP of this remote terminal WD1 send a request for service, destined to the ADSL modem AM of the communications network which is always on. This requested service comprises the following service features: at first showing a set of stored movies and subsequently digital pictures also stored at a storage server SD. These movies and pictures are to be accompanied by a corresponding music also stored at the storage server WD.

Then the request reception part RRP of the ADSL modem AM receives the request for service which was forwarded by the waking device WD1 and hand over the request for service to the request processing part RPP of the ADSL modem AM that at reception of the request for service, generate, based on the service features in the service request of the waking device WD1, a request to wake up each sleeping device that corresponds to a service feature of the service features comprised by the request for service.

The request processing part RPP determines from the request for service that the requested service features are the following service features: displaying digital video, displaying digital pictures and playing an MP3 music file which all are stored at a storage server. The sleeping device required for displaying the digital movies is the sleeping digital VCR SD2, for displaying the digital pictures the sleeping digital camera SD3 is necessary, for playing the MP3 music file the MP3 player is required and finally all files are stored at the currently sleeping storage server SD that should be activated. As a consequence the Digital VCR SD2, the digital camera SD3, the MP3 player SD1 and the storage device SD should be woken up. Subsequently, the request processing part RPP generates a wake up request for each of these devices and forwards these requests towards the a wake up instruction forwarding part WIFP, that subsequently sends the request to wake up to each of the sleeping device which are previously determined to be woken up.

The wake up receiving and activating part WRAP of each of the sleeping devices SD . . . SD3 receive the wake up request, interpret the request and subsequently wake up the corresponding sleeping device SD . . . SD3.

Alternatively the request processing part RPP may generate one single wake up request which includes wake up messages for each sleeping device to be woken up a whereafter the wake up instruction forwarding part WIFP broadcasts the wake up request generated by request processing part RPR to all sleeping devices. In this situation the wake up receiving and activating parts WRAP of each of the sleeping devices SD . . . SD4 receives the broadcasted wake up request and subsequently interpret the request to determine whether or not the device should be woken up in order to provision a service to the requesting waking device WD1. Only the wake up receiving and activating parts WRAP of sleeping devices SD, SD1, SD2 and SD3 find out that the service of the corresponding sleeping device is requested and subsequently wake up the device.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus and communication networks, it is to be clearly understood that this description is made only by way of example and not as a limitation on the scope of the invention, as defined in the appended claims.

The invention claimed is:

1. A method for waking up a sleeping device of a plurality of sleeping devices, each sleeping device of said plurality of sleeping devices being coupled to a waking device over a communications network and adapted to provide a service feature, in an awake state, to said waking device at request for said service feature from said waking device, said method comprises:
   said waking device sending said request for service, said service comprising a plurality of service features to a network element of said communications network;
   said network element receiving said request for service from said waking device;
   said network element, at the reception of said request for service, requesting, based on said plurality of service features in said service request of said waking device, each sleeping device of said plurality of sleeping devices that corresponds to a service feature of said plurality of service features comprised by said request for service, to wake up at substantially same time.

2. The method according to claim 1, wherein the network element analyzes the plurality of service features in the service request and based on the plurality of service features selects at least two of the sleeping devices, and wherein the selected at least two sleeping devices are woken up at substantially same time by the service request, which is a single message.

3. The method according to claim 2, wherein the network element issues a plurality of wake up commands, each corresponding to each of the selected sleeping devices and wherein the plurality of wake up commands are issued based on the single service request message received from the waking device and wherein the service request message comprises service features that can be implemented only by awake devices.

4. The method according to claim 1, wherein the network element does not have a sleeping mode.

5. The method according to claim 1, wherein the network element is an asymmetrical digital subscriber line modem.

6. The method according to claim 5, wherein the network element is connected to the sleeping devices via a local access network and to the waking device via a universal mobile telecommunications system (UMTS) network.

7. The method according to claim 6, wherein the sleeping devices comprise at least one of a television, a digital camera, a video camera, a media player, and a storage server.

8. The method according to claim 6, wherein the sleeping devices comprise consumer electronic devices.

9. The method according to claim 8, wherein the waking device comprises at least one of a personal assistant device, a telephone set, a remote user terminal, and a terminal of a universal mobile telecommunications system (UMTS) network.

10. The method according to claim 8, wherein the waking device, via a single request for service, wakes up at least two different consumer electronic devices.

11. The method according to claim 10, wherein the network element analyzes the request for service and wherein the network element determines the at least two different consumer electronic devices for implementing the request for service based on information in the received request for service.

12. The method according to claim 1, wherein the network element issues a plurality of wake up commands, each corresponding to each of the selected sleeping devices and wherein the plurality of wake up commands are issued based on the single service request message received from the waking device and wherein the issued wake up commands are transmitted to the respective sleeping devices at substantially same time.

13. A network element for waking up a sleeping device of a plurality of sleeping devices, each sleeping device of said plurality of sleeping devices being coupled to a waking device over a communications network and adapted to provide a service feature, in an awake state, to said waking device at request for service from said waking device, said network element comprises:
   a request reception part, adapted to receive said request for service, said service comprising a plurality of service features, forwarded by said waking device;
   a request processing part, coupled with an input to an output of said request reception part and adapted to, at the reception of said request for service, generate, based on said plurality of service features in said service request of said waking device, a request to wake up at substantially same time, each sleeping device of said plurality of sleeping devices that corresponds to a service feature of said plurality of service features comprised by said request for service; and
   a wake up instruction forwarding part, coupled at an input to an output of said request processing part and adapted to send said request to wake up to said each sleeping device of said plurality of sleeping devices.

14. A waking device, for waking up a sleeping device of a plurality of sleeping devices, each sleeping device of said plurality of sleeping devices being coupled to said waking device over a communications network and being adapted to provide a service feature in an awake state, to said waking device at request for service from said waking device, said waking device comprises:
   a service request forwarding part, adapted to forward a request for service, destined to a network element of said communications network, where said requested service comprises a plurality of service features for at least two of the plurality of sleeping devices,
   wherein a network element wakes up at substantially same time each sleeping device of said plurality of sleeping devices that corresponds to a service feature of said plurality of service features.

15. A sleeping device being coupled to a waking device over a communications network and adapted to provide a service feature, in an awake state, to said waking device at request for service from said waking device, the sleeping device comprises:

a wake up receiving part which is adapted to receive a wake up request; and activating part adapted to interpret said request and wake up said sleeping device based on said request for service, wherein the request to wake up is not unique to the sleeping device and comprises a plurality of service features that are executed by different sleeping devices, wherein whether to generate the wake up request for the sleeping device is determined based on the service features in the service request, and wherein the sleeping device is remotely located from other sleeping devices.

16. The sleeping device according to claim 15, wherein the wake up request is common to the sleeping device and at least one of the other, remotely located, sleeping devices and wherein the wake up request is a broadcast message broadcasted to the sleeping device and said at least one of the other, remotely located, sleeping devices.

17. The sleeping device according to claim 16, wherein the sleeping device is a device of a home network and wherein the sleeping device and the other sleeping devices are connected to each other via local access network.

18. The sleeping device according to claim 17, wherein the sleeping device and the other sleeping devices are consumer electronic devices.

19. The sleeping device according to claim 15, wherein the network element, that determines whether to send the wake up request based on the plurality of service features in the service request, does not have a sleeping mode.

* * * * *

UNITED STATES PATENT AND TRADEMARK OFFICE
CERTIFICATE OF CORRECTION

PATENT NO. : 7,600,137 B2  Page 1 of 1
APPLICATION NO. : 11/010437
DATED : October 6, 2009
INVENTOR(S) : Trappeniers et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1088 days.

Signed and Sealed this

Fifth Day of October, 2010

David J. Kappos
*Director of the United States Patent and Trademark Office*